(12) United States Patent
Hootman et al.

(10) Patent No.: US 6,619,533 B1
(45) Date of Patent: Sep. 16, 2003

(54) MULTI-PIECE EXTRUDED LINK ARM

(75) Inventors: Jon Hootman, Oak Creek, WI (US);
John F. Hinrichs, Menomonee Falls, WI (US); Jeffrey S. Noruk, Mequon, WI (US); Mike Gall, LaCrosse, WI (US); Phillip C. Ruehl, Elm Grove, WI (US)

(73) Assignee: Tower Automotive Technology Products, Inc., Grand Rapids, MI (US)

( * ) Notice: Subject to any disclaimer, the term of this patent is extended or adjusted under 35 U.S.C. 154(b) by 0 days.

(21) Appl. No.: 09/667,909

(22) Filed: Sep. 22, 2000

(51) Int. Cl.⁷ .......................... B23K 20/12; B23K 31/10
(52) U.S. Cl. ..................... 228/112.1; 228/160
(58) Field of Search .................. 228/160, 112.1, 228/2.1; 188/371, 321.11; 293/133; 403/300, 2; 280/777, 784, 805, 124.134, 124.151; 74/492; 296/188, 199; 267/141, 152, 153, 220; 297/472, 421

(56) References Cited

U.S. PATENT DOCUMENTS

| | | |
|---|---|---|
| 1,400,829 A | 12/1921 | Oakley |
| 2,553,935 A | 5/1951 | Parks et al. ............... 29/156.5 |
| 3,136,048 A | 6/1964 | Gallagher ..................... 29/417 |
| 4,030,179 A | 6/1977 | Schwarz ..................... 29/156.5 |
| 4,993,150 A | 2/1991 | Reinhardt et al. ....... 29/888.43 |
| 5,004,264 A | 4/1991 | Kozaki et al. .............. 280/707 |
| 5,460,317 A | 10/1995 | Thomas et al. .......... 228/112.1 |
| 5,813,592 A | 9/1998 | Midling et al. .......... 228/112.1 |
| 5,826,331 A | 10/1998 | Myers et al. ............. 29/888.09 |
| 5,829,664 A | 11/1998 | Spinella et al. .......... 228/112.1 |
| 5,971,247 A | 10/1999 | Gentry ....................... 228/2.1 |
| 5,979,742 A | 11/1999 | Enomoto et al. ........ 228/112.1 |
| 6,050,474 A * | 4/2000 | Aota et al. |
| 6,273,323 B1 * | 8/2001 | Ezumi et al. |
| 6,298,962 B1 * | 10/2001 | Kato et al. |

FOREIGN PATENT DOCUMENTS

| | | | |
|---|---|---|---|
| EP | 1046453 A2 | * | 10/2000 |
| JP | 10035235 | | 2/1998 |
| JP | 11058036 | | 3/1999 |
| JP | 11101286 | | 4/1999 |
| JP | 11347754 | | 12/1999 |
| JP | 2000061663 | | 2/2000 |
| JP | 2000304029 A | * | 10/2000 |

OTHER PUBLICATIONS

WO 01/74526 A1 Waldron et al. (Oct. 11, 2001).*
US 2001/0030222A1 Konno et al. (Oct. 18, 2001).*
Patent Cooperation Treaty International Search Report for International Application No. PCT/US01/27546, filed Sep. 6, 2001.

* cited by examiner

Primary Examiner—Tom Dunn
Assistant Examiner—Kiley Stoner
(74) Attorney, Agent, or Firm—Van Dyke, Gardner, Linn & Burkhart, LLP

(57) ABSTRACT

Link arms for use in suspension systems are produced through an extrusion and friction stir welding process. Blocks having an eye and a planar body section are formed through an extrusion process. These sections are then paired together and joined through friction stir welding. The welded joint(s) is/are positioned in such a location so as to not impact the structural integrity of the completed component. Through this process it is possible to construct cost competitive link arms having the same or better structural integrity as previously employed steel link arms while achieving dramatic weight reductions.

11 Claims, 10 Drawing Sheets

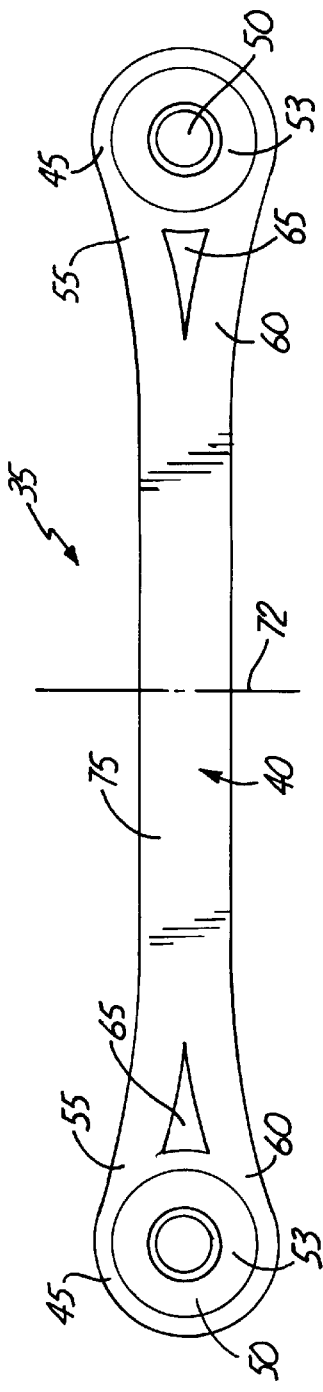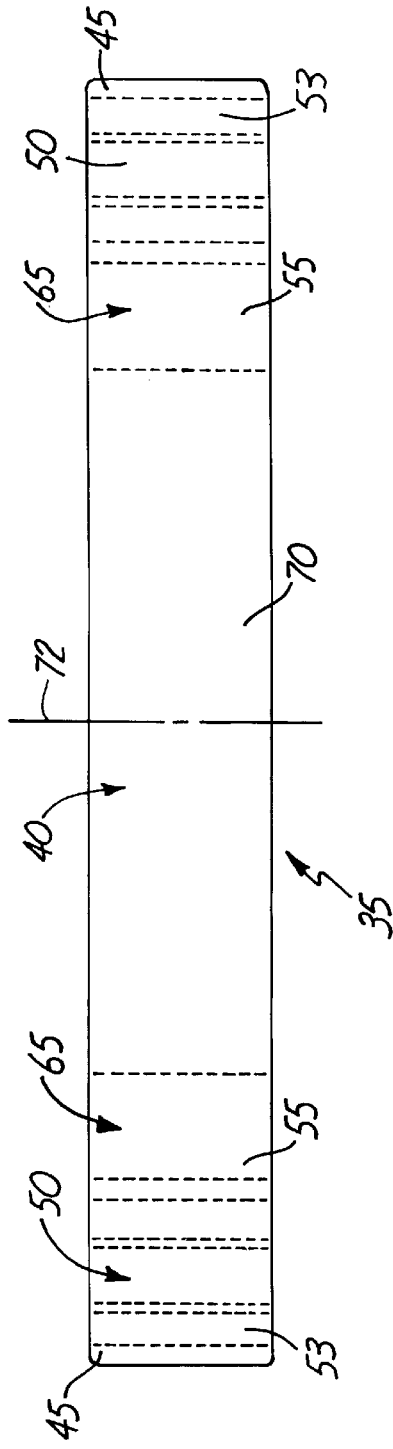

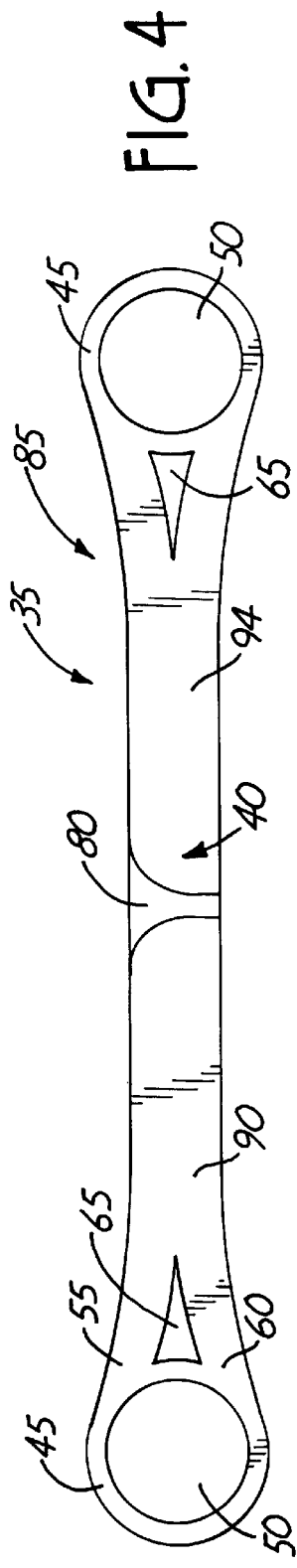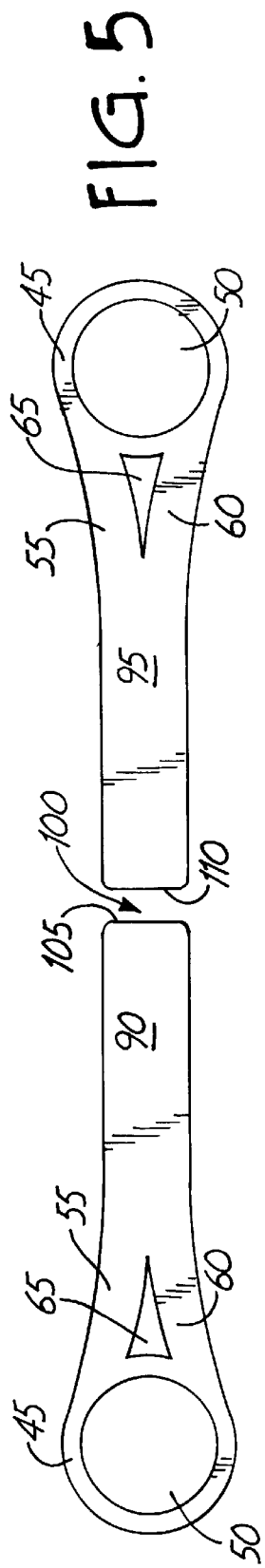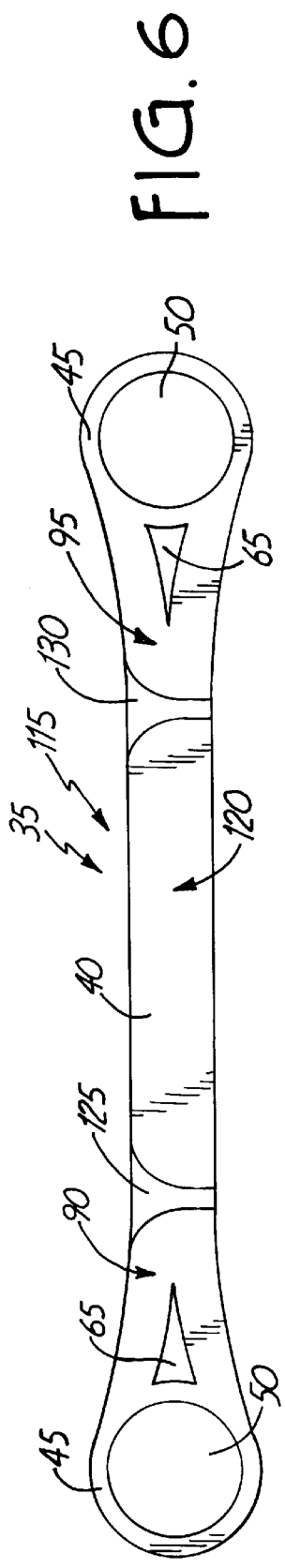

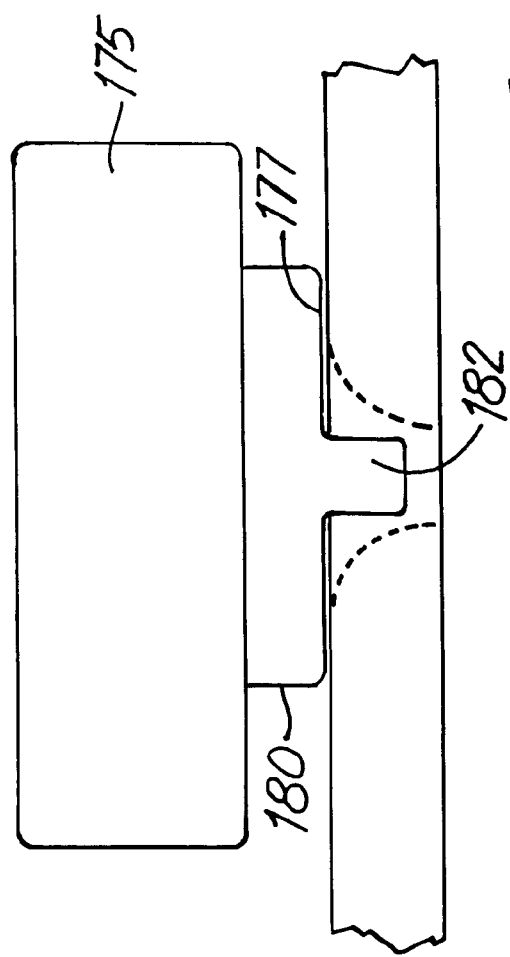

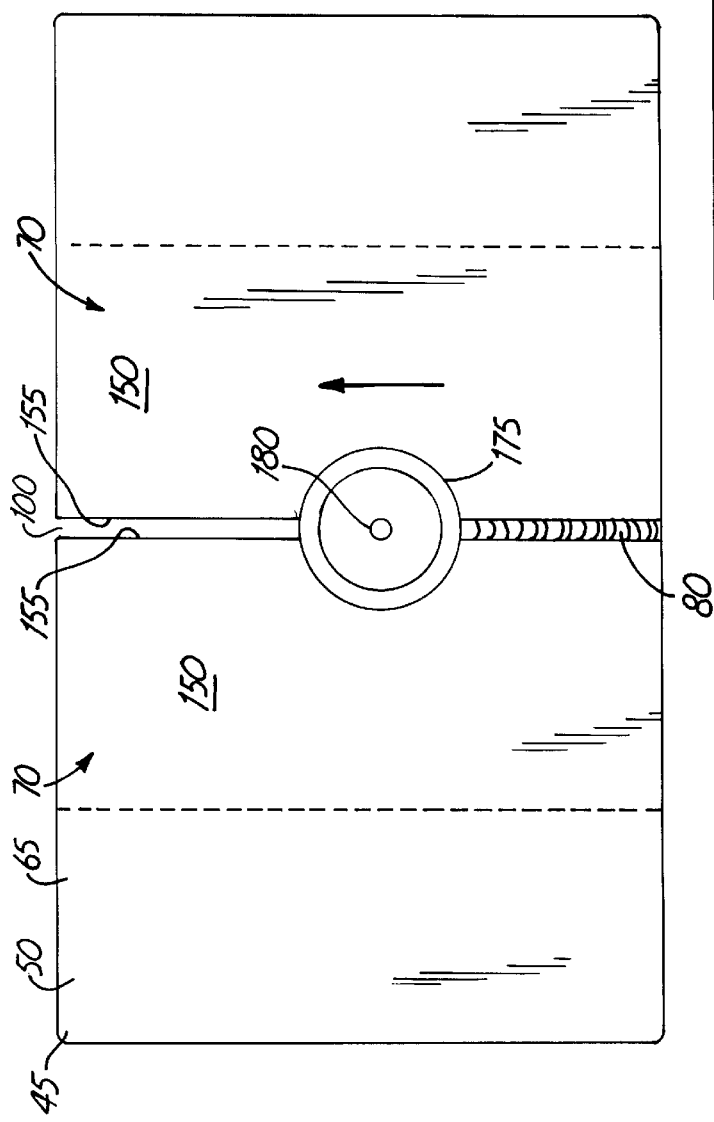
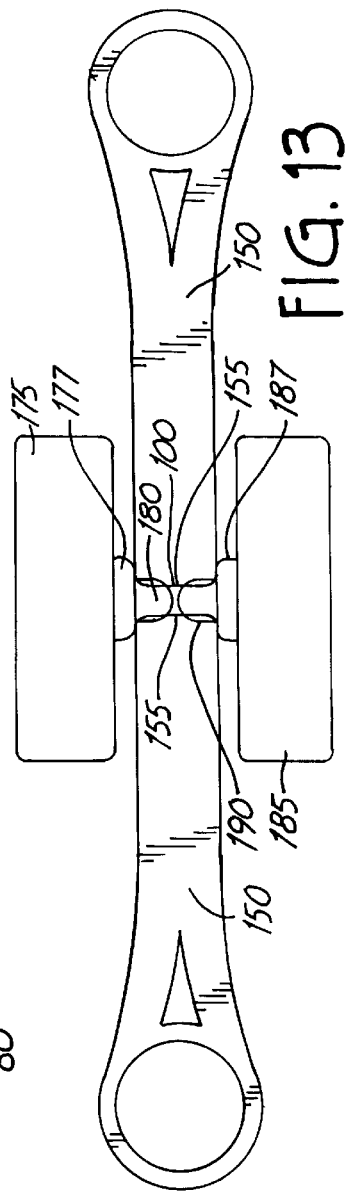

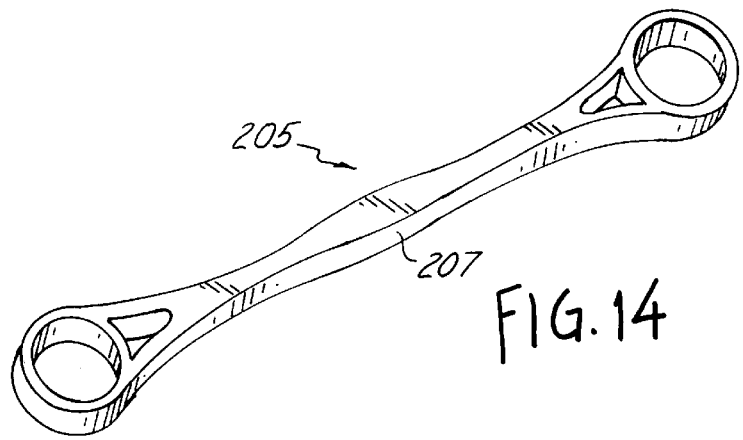
FIG.14
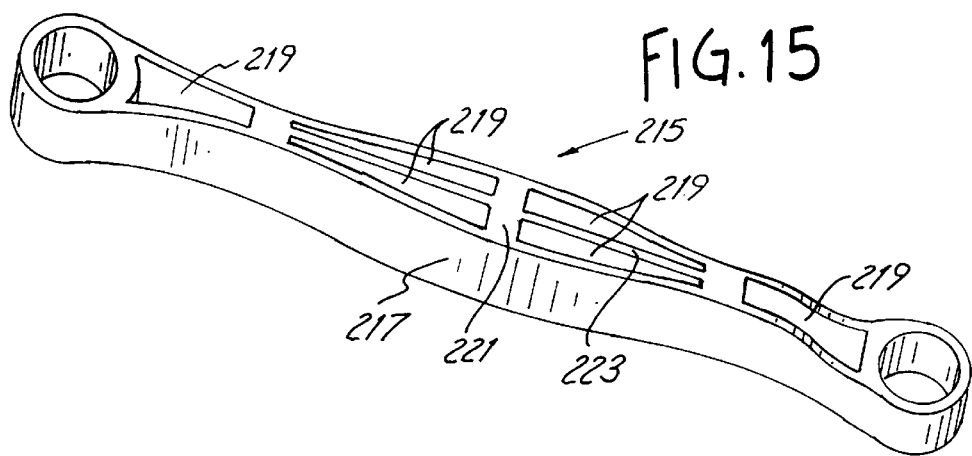
FIG.15
FIG.16
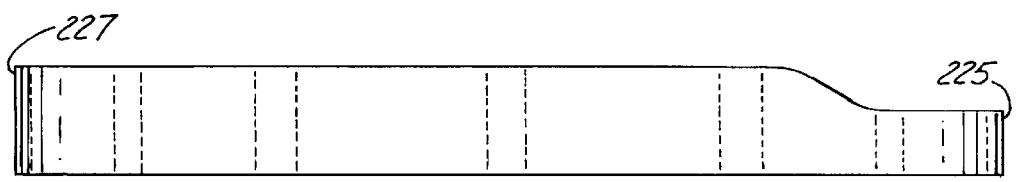

MULTI-PIECE EXTRUDED LINK ARM

BACKGROUND OF THE INVENTION

1. Field of the Invention

The present invention relates to automotive component parts. More specifically, the present invention relates to the efficient fabrication of automotive suspension parts by first extruding portions thereof, and subsequently joining these various sections to form the completed automotive parts.

2. Description of the Related Art

In any given automobile design, countless diverse components are operatively coupled together to create a sophisticated, high performance machine. Certain components are relatively simple in their design, but can always be improved. Further, the way these parts are fabricated can similarly be improved to provide additional advantages and features. For example, design improvements can continually be made to improve the structural integrity of the product itself. These design improvements may involve how internal component stresses can be better handled, or may allow for manufacturing efficiencies to be improved. Furthermore, weight reduction can be realized through these design improvements.

Many components have fairly straight forward design criteria based upon their purpose, function, and relationship with other components. One such component is the link arm, or link rod, that is used in suspension systems. A common link rod design is made up of a steel tube that is welded between a pair of steel eyes. Each eye is fabricated from a steel ring having a wall thickness sufficient to provide the necessary structural performance. To join these components together, the eyes are welded to each end of the steel tube. Generally a gas metal arc weld (GMAW) is utilized to achieve the necessary bonding characteristics.

As is obvious, any components, such as the link rod, which carry loads in a vehicle must easily withstand all loads without the possibility of failure. Due to the shape, design and interconnection of the various components that make up a typical link arm, a majority of the load stress is concentrated at the weld area. It is normally undesirable to have significant loads carried by welded joints due to the possibility of irregularities and inconsistencies in the weld. Geometrical changes are produced at weld joints which cause stress concentration areas reducing product performance. Significant changes in the geometry and metallurgy at the welded joints create a possibility for product breakage or failure. The location of weld joints is consequently a very important design consideration.

The use of designs which include a significant number of welded components are further undesirable due to problems in maintaining tolerances. More specifically, it is difficult to maintain precise tolerances among components when undergoing welding operations due to the substantial heat and material stresses that are introduced through the welding process, causing expansion, bending, bowing and other misalignment concerns. In the specific case of the link arm, maintaining exact dimensions and alignment between the two eyes becomes difficult during the welding processes.

Another consideration in today's market is that vehicles are becoming increasingly modular, which requires flexibility among the various components. Naturally, the various components must meet certain physical requirements which are dictated by their application. For example, the link arm is limited to certain lengths and overall dimensions which must possess sufficient structural integrity to withstand certain predetermined axial load levels. Various vehicles may require similar characteristics from its link arms, but may have different length specifications and packaging constraints. Unfortunately, two separately fabricated parts are typically necessary to meet this need.

In addition to all of the structural and strength requirements, weight and cost are also concerns. Any reduction in weight of various component parts results in similar weight reductions for the overall vehicle weight. Naturally, this will result in improved vehicle operating costs, power requirements, etc. Cost concerns are overcome by manufacturing efficiencies which help to reduce overall production costs, and final component part costs as well. Consequently, cost and weight reductions are continual goals when designing any particular component. Therefore, there exists a need to provide an improved link arm meeting the predetermined structural requirements while meeting or exceeding current efficiencies in cost and production, while allowing for a reduction in weight.

SUMMARY OF THE INVENTION

The present invention seeks to produce a link arm with a flexible design for use in a vehicle suspension system which has a need for a reduction in weight. Specifically, the present invention reduces the overall weight and manufacturing complexity of the link arm or rod while maintaining a competitive cost. In achieving these weight and cost savings, the design of the present invention provides either equal or improved levels of structural reliability.

To achieve the weight reduction desired, the link arm of the present invention is comprised entirely of aluminum (or other similar light weight materials). In the case of the extruded aluminum link rod of this present invention, weight reductions of thirty percent or more from a similarly sized and shaped traditional steel link arm can be realized. However, replacing steel with aluminum creates additional complications. That is, it is generally not practical to join a tubular aluminum rod to a pair of aluminum rings or eyes as was the approach in the steel link arm. This impracticality is due to differing material strengths and weld characteristics, with the welds having less than half of the strength of the base material. As previously discussed, the transition from the small diameter steel tube to the large diameter eye concentrates a majority of the load stress in the weld area. Aluminum components of this configuration would not easily meet all of the necessary manufacturing and design requirements of the end product while producing a weight reduction.

To achieve the desired weight reduction by utilizing aluminum, the configuration of the link arm of the present invention is quite distinct from its steel counterparts. Furthermore, to produce such an aluminum link arm in a cost effective manner, a new manufacturing process is utilized.

When viewed from the top (or bottom), the completed aluminum link arm has a generally rectangular configuration. When viewed from the side, a substantial portion of the interior or center section is also rectangular in configuration. Towards each end of the link arm, a transition area begins to taper outward and split, forming a pair of transition arms. An area between the transition arms is hollow. The transition arms terminate in an integrally connected hollow aluminum eye. Again, the entire link arm is fabricated from aluminum achieving a significant reduction in weight. As previously mentioned, other lightweight materials could also be used to fabricate the product, so long as they meet the material and performance requirements outlined below.

To form the aluminum link arm, aluminum is fed through an extrusion press to form components having the desired cross-sectional shape. Several options exist as to the exact number of extruded components required to form a completed link arm. While theoretically possible to form the entire link arm in a single extrusion process, this approach is not practical due to the length of a typical link rod. At present, it is not cost effective to utilize an extruder capable of producing a single extrusion link arm due to the higher cost and poor tolerances of larger extrusions. Thus, for practical purposes the aluminum link arm of the present invention is formed from at least two extruded components.

In a first embodiment, the extruded component forms one-half of the completed aluminum link arm. As further outlined below, these extruded components are then friction stir welded and subsequently cut to size after welding. The welded extrusion assembly has a length much larger than the eventual width of a single completed link arm component. To join the extrusions they are first paired side by side and then fed through a friction stir welder. Each single extrusion forms one side of the completed product including the above-described eye and a pair of transition arms which lead to a generally rectangular section which terminates in an edge for friction stir welding. By abutting the friction stir welding edge of two such extrusions and then welding them, the resulting cross-sectional configuration is that of the aluminum link arm.

By joining two extrusions through the friction stir welding process, no additional material is added (thus preventing additional weight). Further, the friction stir weld process produces welds that are near base material strength, or two times the strength of gas metal arc welds. The welds are thus more than capable of withstanding the loads exerted upon a completed link arm. Since the remainder of the link arm is integrally formed through the extrusion process, there is no joint or weld that interconnects the main body of the arm to the eye portions. Stated alternatively, the friction stir weld is not placed in the same location as that of the steel Gas Metal Arc welded tubular link rod.

In a second possible embodiment, three separate extrusions are used to form a completed link arm. The first two extrusions are similar to those produced in the first embodiment. That is, a hollow eye is produced which is integrally connected to a pair of transition arms that tapers into a somewhat rectangular area that terminates in an edge for friction stir welding. One could simply connect these two extrusions together and produce what amounts to a shortened aluminum link arm. However, in this embodiment a third extrusion or plate is utilized. The third piece is a generally rectangular member having a cross-sectional height equal to the cross-sectional height of the extrusions containing the eye and a predetermined length. The extruded components are aligned so that the rectangular section is disposed between the two extrusions having hollow eyes. Specifically, the edges are aligned and again are joined through a friction stir welding process. Thus, by adjusting the dimensions of the center-piece, the overall length of the link arm can easily be modified.

The combination of extruded component parts and friction stir welding provides a very efficient manufacturing process. The extrusion process is relatively simple and inexpensive. The friction stir welding process is efficient and provides high integrity joints. What results is an aluminum link arm having a weight reduction of at least one-third of its steel counterpart while maintaining or exceeding the structural viability of the steel counterpart. Importantly, the total costs to produce the aluminum link arm is low and is comparable with that of producing steel link rods due to the elimination of manufacturing processes.

As is known, friction stir welding occurs by plunging a rotating tool into the metal of two abutted components. The rotating tool is then moved along the seam between these two components. As this occurs, the material is plasticized and mixed essentially forming a bond between the two components. The depth of the tool is selected to correspond to the depth of a seam. In the present invention, the rotating tool passes along the seam created when the two extrusions are aligned side by side. By having the rotating tool travel the entire length, a strong and consistent weld is created along the entire length of the seam. Friction stir welding operations may be performed on one or both sides of the component, depending upon the desired weld characteristics. In another variant, two friction stir welders can be used, each acting along opposite sides of the same seam simultaneously. The friction stir weld tools plunge into the two abutted components, one from the top and the other from the bottom.

Friction stir welding is an important aspect of the present invention due to the resulting consistent, high integrity and quality bond. As previously mentioned, an extremely strong weld occurs between the various components. Additionally, friction stir welding requires minimal amounts of heat as compared to other welding processes, and consequently avoids many disadvantages of classical welding processes. That is, residual stresses and distortion generally caused by the heat utilized in traditional welding processes is significantly reduced through the use of friction stir welding. Thus, friction stir welding accommodates the production of more precise and easily controlled parts because distortion is not inherently created.

BRIEF DESCRIPTION OF THE DRAWINGS

FIG. 2 is an end view of an aluminum link arm of the present invention.

FIG. 3 is a top, partially sectional view of an aluminum link arm of the present invention.

FIG. 4 is an end view of a single joint aluminum link arm.

FIG. 5 is an end view of the two extrusions used to form a single joint aluminum link arm.

FIG. 6 is an end view of a double joint aluminum link arm.

FIG. 11 is an end, schematic view of a pair of extrusions being friction stir welded together by a friction stir welder.

FIG. 12 is a top view of pair of extrusions being friction stir welded together.

FIG. 13 is an end, schematic view of an alternative embodiment wherein the extrusions are simultaneously friction stir welded utilizing two stir weld tools.

FIGS. 14, 15 and 17 illustrate various alternative embodiments of the link arm of the present invention which have altered cross sectional configurations.

FIG. 16 illustrates the side view of the link arm shown in FIG. 15.

DETAILED DESCRIPTION OF PREFERRED EMBODIMENTS

Figure 1:
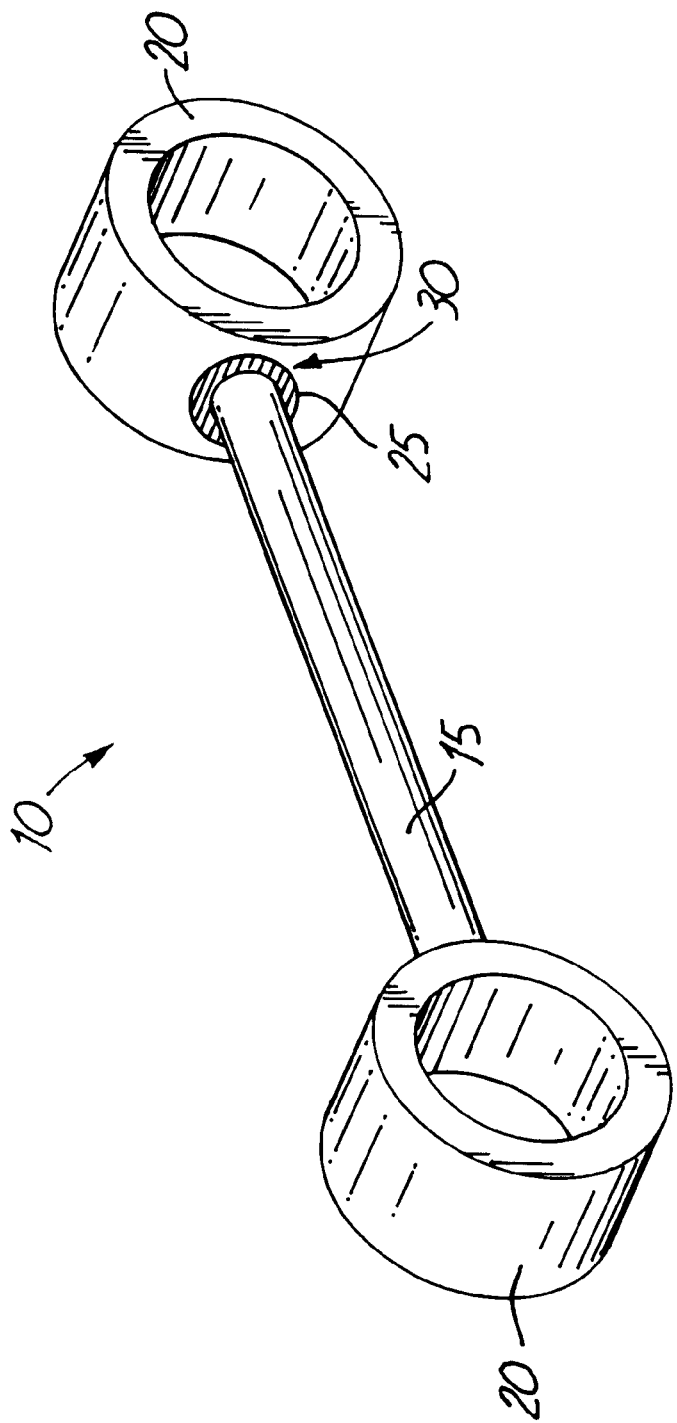
FIG. 1 is a perspective view of a prior art steel link arm.

Referring to FIG. 1, a representative steel link arm 10 is illustrated. Steel link arm 10 includes a steel tube 15 forming a main body of the component and a pair of steel eyes 20 attached to each end. Steel tube 15 is generally cylindrical in nature and may or may not be hollow depending upon the desired configuration. Steel eyes 20 are each welded to an end of steel tube 15. Each steel eye 20 is a cylindrical member having a hollow interior configured for attachment to other components. In use, a bushing (not shown) is inserted into each eye 20 and steel link arm 10 is then used as a connective component in the link arm suspension system.

As mentioned above, steel link arm 10 is manufactured from three separate components that are joined together through a typical welding process. More specifically, steel tube 15 is typically welded to steel eye 20 at weld area 25 by a gas metal arc welding (GMAW) process. Because the diameter of steel tube 15 is significantly smaller than the width of steel eye 20, force typically applied to link arm 10 when in use creates stress concentrated at weld area 25. With this configuration of a link arm 10, the strength and integrity of the weld between steel tube 15 and each steel eye 20 is critical.

Referring to FIG. 2, the link arm of the present invention is illustrated and generally referred to as 35. Link arm 35 has a generally rectangular center section 40 forming a main body of the component and at each end of center section 40 is an eye 45 having a hollow eye interior 50. Center section 40 essentially splits into two transition arms, upper transition arm 55 and lower transition arm 60, as it transforms into eye 45. Hollow area 65 is formed between upper transition arm 55 and lower transition arm 60.

Link arm 35 is partially formed through an extrusion process. While various components or portions are separately identified and enumerated, it is to be understood that link arm 35 (when completed) is essentially a unitary, integral mass of solid aluminum and that the indication of various components or portions thereof is for illustrative purposes only. As outlined below, the joining or welding of components is minimized to avoid issues related to weld joints.

Hollow area 65 is formed during the extrusion process and represents the location within the extrusion where aluminum is not allowed to pass. Hollow area 65 is an optional feature and simply serves to allow for additional weight reductions in that aluminum need not be present in that location in order to provide the required level of structural integrity to link arm 35. If so desired, additional hollow areas could be located within side surface 75 to achieve further weight reductions so long as the specific levels of structural integrity are maintained.

In use, bushings 53 are placed within eye interior 50 of each eye 45. Subsequently, link arm 35 is used as a connective member in a link arm suspension system. In one embodiment of the invention, link arm 35 is constructed entirely from aluminum resulting in a significant weight reduction when compared to a similarly sized steel link arm 10. When fabricated in aluminum, link arm 35 weighs less than that of the steel link arm 10. It should be noted that while aluminum is the preferred material, other materials could be utilized.

FIG. 3 is a top view of link arm 35 and illustrates the generally rectangular overall shape of the component and in particular its upper surface 70. FIGS. 2 and 3 illustrate how, in this particular embodiment, link arm 35 is generally symmetrical about a medial bisecting axis 72.

FIGS. 2 and 3 show aluminum link arm 35 as a single integral component. As previously discussed, link arm 35 is partially manufactured through an extrusion process. Therefore, to form link arm 35 as a single integral unit, it would have to be extruded in its completed form as illustrated. As a practical matter, link arm 35 in most applications will be approximately 12 to 25 inches in length. Common extrusion equipment can easily fabricate parts up to approximately 9 inches in diameter—approximately one half a typical length of link arm 35. While longer extrusions are possible, it becomes difficult to maintain tolerances, quality, and productivity and their cost per unit of mass increases. This cost becomes excessive and limits this approach as a viable production option. Therefore, the present invention contemplates forming link arm 35 from at least two separate components.

FIG. 4 illustrates a single joint link arm 85 in schematic form, showing how this product is formed from two components. Single joint link arm 85 is formed by coupling a first extrusion 90 to a second extrusion 95 via a friction stir welded joint 80. While friction stir welded joint 80 is shown as a somewhat U-shaped area, it is understood that this is continuous material. Further, the actual configuration or friction stir weld joint 80 may change depending on various process details. Resulting in a single joint link arm 85 having the desired length by using two separate smaller components, thus significantly reducing the cost of the product. When completed, single joint link arm 85 will have a configuration identical to link arm 35, thus those reference numbers are used interchangeably throughout this application.

In order to effectively and efficiently create link arm 35 from multiple components, the components are joined by friction stir welding. The resulting friction stir weld joint 80 has nearly the same strength of the base material and is capable of withstanding the loads to which link arm 35 is subjected. As previously discussed, eye 45 is integral with upper transition arm 55 and lower transition arm 60, thus there are no areas which traditionally experience a concentration of stress. The gradual transition of the design geometry provides for this elimination of structural weakness.

FIG. 5 is a side view of the two components used to form single joint aluminum link arm 85 prior to the joining process. As illustrated, first extrusion 90 terminates in a first extrusion edge 105 and second extrusion 95 terminates in a second extrusion edge 110. First extrusion edge 105 is abutted against second extrusion edge 110. Subsequently, a friction stir welding process is commenced joining the two components together. Further details regarding this friction stir welding process are outlined below. In this embodiment, first extrusion 90 represents one-half of the completed single joint link arm 85 while second extrusion 95 represents the entirety of the other half. Thus, the length of single joint link arm 85 is easily controlled by appropriately sizing each extrusion 90, 95. In other words, different sized extrusions 90, 95 can easily be manufactured to create completed single joint link arm 35 of various lengths. Additionally, variations in each component can be easily accommodated. While the two extrusions, 90 and 95, are shown to be substantially similar in their cross-section, this is not necessarily a requirement. It is easily understood that non-symmetrical link rods can easily be manufactured using the principles outlined above.

The present design of link arm 35 can easily be modified to create a variety of different sizes and lengths. When it is desired to produce a variety of link arms having different lengths, it may be more efficient to produce the multiple joint link arm 115 as illustrated in FIG. 6. Multiple joint link arm 115 is formed from three separate components—a first extrusion 90, a rectangular extrusion 120, and a second extrusion 95. To create the completed product rectangular extrusion 120 is inserted between first extrusion 90 and second extrusion 95. These components are subsequently joined to one another through the friction stir welding process producing a first friction stir weld joint 125 and a second friction stir weld joint 130. In this design, it is readily apparent that varying the length of rectangular extrusion 120 will result in the production of multiple joint aluminum link arms 115 having different lengths. It is also readily apparent that using first and second extrusion 90, 95 of the embodiment in FIG. 4 with the rectangular extrusion 120 is possible and can result in an even longer multiple joint link arms 115.

Once again, first friction stir weld joint 125 and second friction stir weld joint 130 are shown as somewhat U-shaped areas of double joint link arm 115. It is again understood that this is for illustrative purposes only as the resulting joint is made up of substantially continuous material. Again, various other configurations are possible, depending upon the various processes utilized to create first friction stir weld joint 125 and second friction stir weld joint 130.

Figure 7:
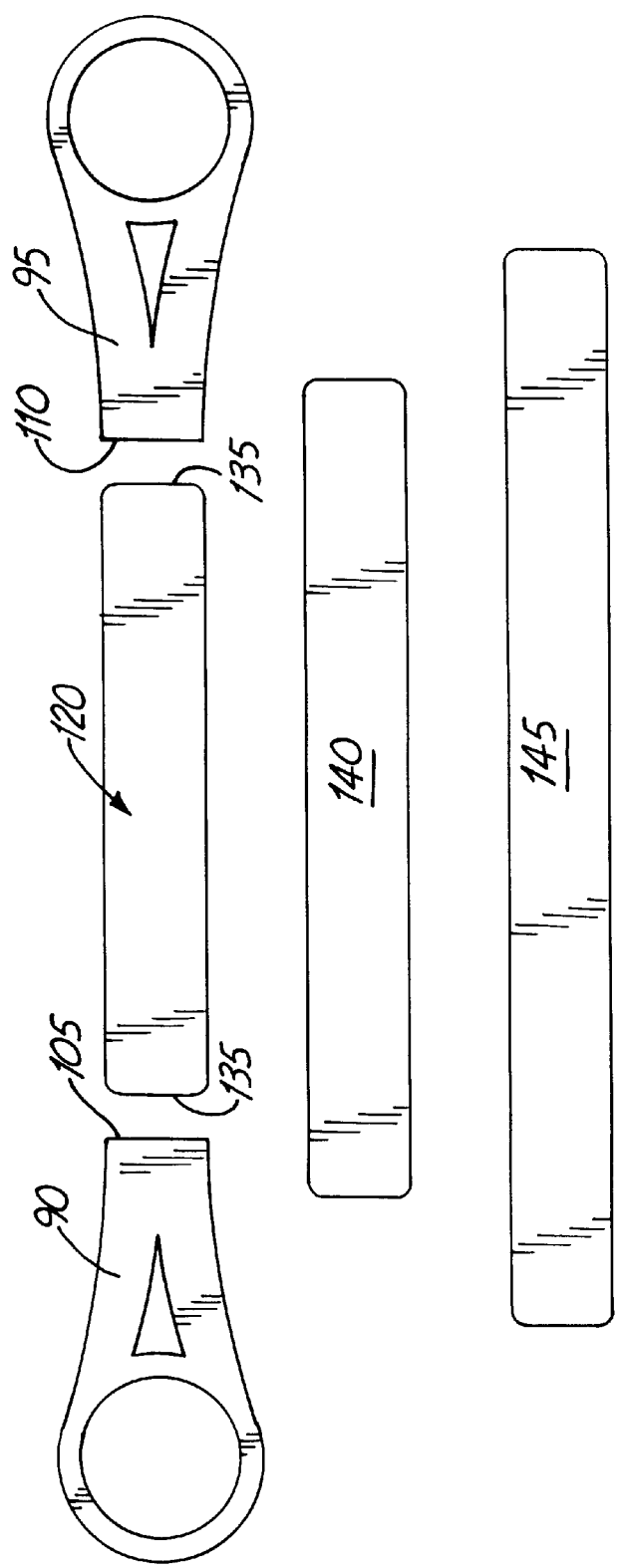
FIG. 7 is an end view of the three extrusions used to form a double joint aluminum link arm along with two alternative rectangular extrusions illustrating how different length double joint aluminum link arms can be formed.

FIG. 7 illustrates double joint aluminum link arm 115 prior to the friction stir welding process. That is, first extrusion 90, rectangular extrusion 120 and second extrusion 95 are still separate from one another. First alternative rectangular extrusion 140 and second alternative rectangular extrusion 145 are provided to illustrate how providing different lengths of the medial section will result in the desired overall dimensions of the completed product. Once again, the location and quality of the friction stir weld joints 125, 130 are such that the overall construction of multiple joint aluminum link arm 115 is structurally sound.

To form multiple joint aluminum link arm 115, first extrusion edge 105 is aligned with one rectangular extrusion edge 135 while second extrusion edge 110 is aligned with the opposite rectangular extrusion edge 135. The components subsequently passed through a friction stir welder to form a first and second friction stir weld joint 125, 130. Ideally, both friction stir weld joints 125, 130 can be formed simultaneously. Alternatively, the joints can be formed one at a time. While the joints shown in FIG. 7 are butt type joints, it is to be clearly understood that other types of joints could be used, such as lap joints or interlocking type joints.

Figure 8:
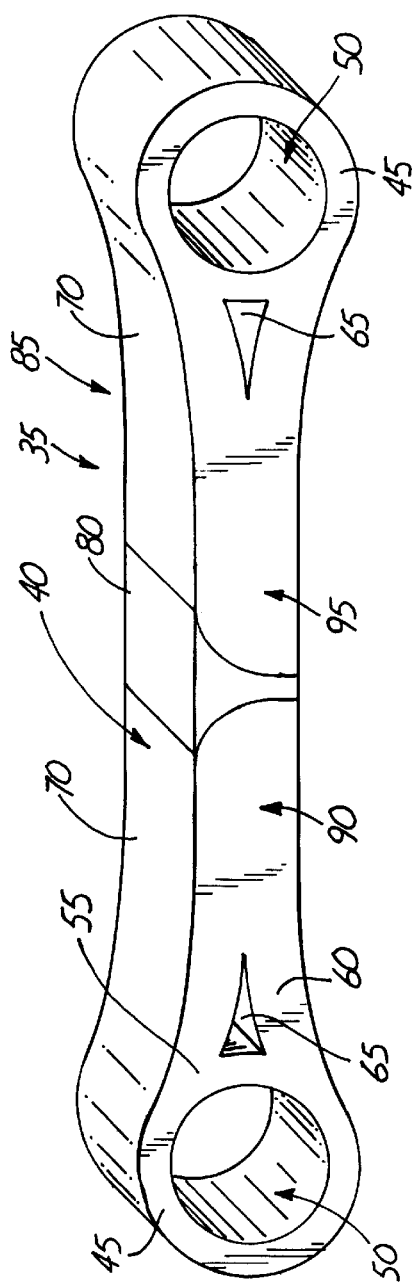
FIG. 8 is a perspective view of a single joint aluminum link arm.

Referring to FIG. 8, a perspective view of a single joint link arm 85 is presented. From this view it becomes apparent how connecting arm 40 is formed from portions of both first extrusion 90 to second extrusion 95. By joining the edges of the first and second extrusions 90, 95 a generally rectangular connecting arm 40 is formed. This presents a seam between two surfaces which can then be optimized for the friction stir welding process. By optimizing the extrusion edges for the friction stir welding process, connecting arm 40 can be thinner with respect to the widest portion of eye 45 due to the improved weld integrity. In other words, upper and lower transition arms 55, 60 are allowed to taper from connection arm 40 to match the dimensions of eye 45. This is opposed to requiring that side surface 75 have a more rectangular configuration equivalent to the widest portion of eye 45 which would in turn require more material and increase the overall weight of the link arm 85.

Figure 9:
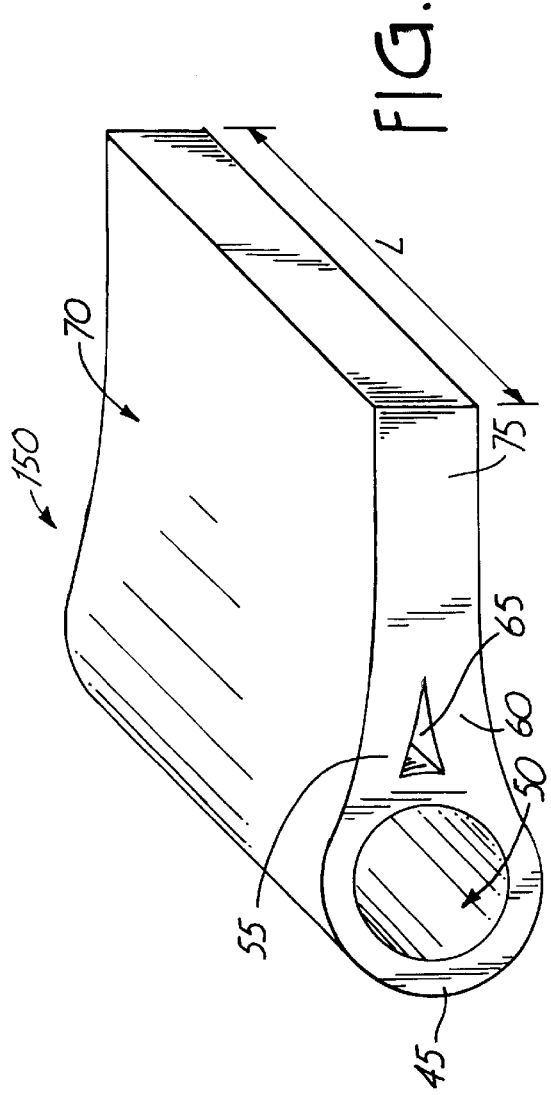
FIG. 9 is a perspective view of an extrusion for a single joint aluminum link arm.

To manufacture link arm 35, aluminum is fed through an extrusion press to produce a relatively large block or extrusion 150 as illustrated in FIG. 9. As viewed from the side surface 75, extrusion 150 is equivalent in size and shape to either first or second extrusion 90, 95. However, extrusion 150 has a much larger length as represented by dimension L. The exact length selected will vary depending on the capabilities of the handling equipment being employed to manufacture completed aluminum link arms 35. Extrusion 150 includes extrusion edge to be friction stir welded 155 on a side opposite of eye 45.

Figure 10:
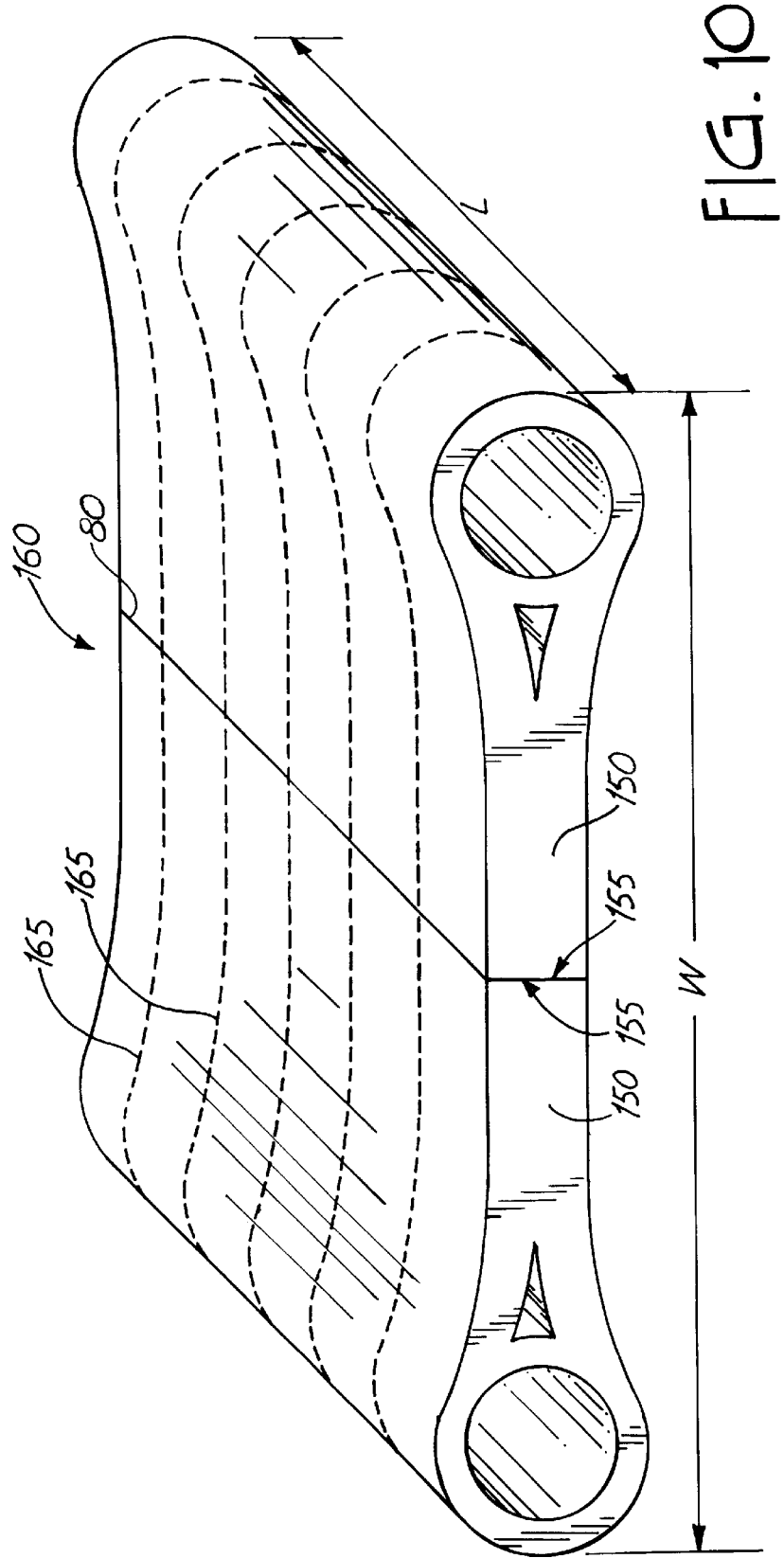
FIG. 10 is a perspective view of two extruded sections friction stir welded together, with dashed lines indicating cut lines to cut the welded block into a plurality of single joint aluminum link arms.

Referring to FIG. 10, it can be seen that two extrusions 150 are joined side by side. More specifically, extruded edge 155 of a first extrusion 150 is abutted against extrusion edge 155 of a second extrusion 150. A friction stir weld 80 is then produced where extrusion edges 155 abut one another. Since the length of the extrusions 150 are identical, when so welded the width W of joined block 160 is equivalent to the length of extrusion 150. Cut lines 165 illustrate where joined block 160 will be cut by cutting saw 170 (schematically illustrated) to form a plurality of single joint aluminum link arms 85. Of course, the cutting process would be the same to produce a plurality of double joint aluminum link arms 115.

Cutting saw 170 is simply schematically illustrated. In practice, cutting saw 170 would be an industrial, high-speed production cutting saw. Alternatively, other cutting methods could be used, such as an industrial band saw, or laser cutting. After each section is cut from joined block 160, the various surfaces are deburred. Subsequently, a bushing 53 is inserted into each eye 45. Various types of bushings may be applied. For example, metal sleeved bushings can be utilized. Eye 45 may need to be reamed so that hollow area 65 is set to the correct dimensions. This is necessary because of the tight tolerances required for such metal sleeve bushings, which may be beyond the capabilities of the extrusion process. If non-sleeve bushings are to be employed, the tolerances of hollow area 65 can be adequately achieved through the extrusion process.

Referring to FIGS. 11 and 12, the friction stir welding process of the present invention is illustrated. As previously explained, to form the completed component the extrusion edges 155 of two opposed extrusion blocks 150 are first aligned against one another. The abutting surfaces between each extrusion edge 155 is referred to as weld seam 100. In practice, first extrusion 90 is abutted against second extrusion 95 and pre-friction stir weld seam 100 is created.

As previously discussed, friction stir welding is accomplished by utilizing a friction stir welder 175 which includes a friction stir welding tool 180. Welding tool 180 includes a pin 182 which extends from a shoulder portion 177. In practice, pin 182 is allowed to extend completely into the work pieces, while shoulder 177 is positioned at or slightly above the adjacent surfaces of the materials being welded. Pin 182 extends into a substantial portion of the weld joint, thus sufficiently plasticizing material in that area.

Once the extrusions are located, the friction stir welder 175 is activated causing the respective welding tool 180 to rotate. The friction stir welder first plunges the tool into the material until shoulder 177 contacts the surface. Then the welding tool 180 is forced along weld seam 100 while it plasticizes and mixes the aluminum. As more clearly shown in FIG. 12, friction stir welder 175 moves along a direction of travel as indicated by the arrow.

The friction stir welding process does not introduce any consumables into the weld joint 80. Thus, the weight of the final product is dependent entirely upon the weight of the extruded aluminum.

Most importantly, the friction stir welding process does not melt the aluminum when producing a quality joint. Thus, the weld joint 80 is formed with a minimal amount of heat which minimizes distortion and loss of material integrity. This results in a better quality bond between the two components. In comparison, traditional welding processes subject the material to extreme amounts of heat which change and ultimately weaken the structural integrity of the aluminum. Thus, the friction stir welding process is critical to the formation and fabrication of link arm 35. Additionally, this allows very precise dimensional tolerances to be maintained.

While a single friction stir welder can be employed in the known way, to bond first extrusion 90 to second extrusion 95, a dual friction stir welder configuration may also be used. As more specifically shown in FIG. 13, a first friction stir welder 175 is orientated above first and second extrusions 90, 95 so that a rotatable welding tool 180 protruding from first friction stir welder 175 is aligned with weld seam 100. Welding tool 180 is selected so that when it is plunged into the aluminum to the maximum depth allowed by shoulder 177, welding tool 180 will extend up to a depth of approximately one-half that of first and second extrusion 90, 95. Similarly, a second friction stir welder 185 is orientated underneath first and second extrusion 90, 95 with a rotatable welding tool 190 orientated with weld seam 100. Once again, the size of the second welding tool 190 is selected so that when plunged into the aluminum to the maximum depth allowed by shoulder 187, welding tool 190 will extend up to approximately one-half the distance into first and second extrusion 90, 95. This allows for significant increases in travel speed, which in turn improves productivity and ultimately reduces part cost.

As mentioned above, the actual cross sectional configuration of the link arm can vary depending on the needs of the application. For example, various openings or gaps can be introduced. FIGS. 14 through 17 illustrate some possible alternative embodiments having these varied cross sections. For example, link arm 205 as illustrated in FIG. 14 has varied height center section 207 wherein additional material is provided to provide a generally hour-glassed shaped configuration. Similarly, link arm 215 shown in FIG. 15 has a similar hour-glassed shaped center section 217. Further, link arm 215 has a plurality of openings 219 therein. Each of these openings help to reduce the overall weight of the product. However, internal connecting ribs 221 and 223 provide all necessary structure to handle the required loads.

FIG. 15 also illustrates that link arms can easily be fabricated having varied heights in their side view dimensions. FIG. 16 illustrates a side view of the link arm 215 previously discussed in FIG. 15. As can be seen, link arm 215 includes a first end 225 that has a reduced height when compared a second end 227. As can be appreciated, this varied height can easily be achieved by appropriate saw cutting operations.

Figure 17:
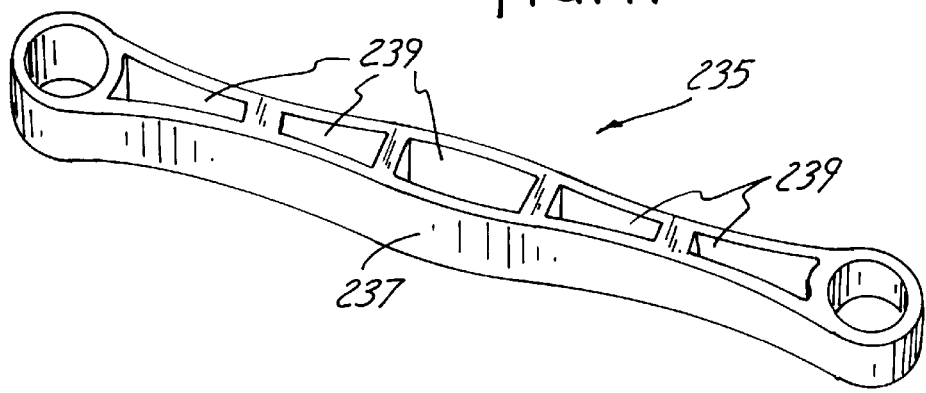

Referring now to FIG. 17, yet another alternative embodiment of the link arm of the present invention is shown. Link arm 235 also includes a substantially hour-glassed shaped center section 237 and a number of openings 239.

Figure 18:
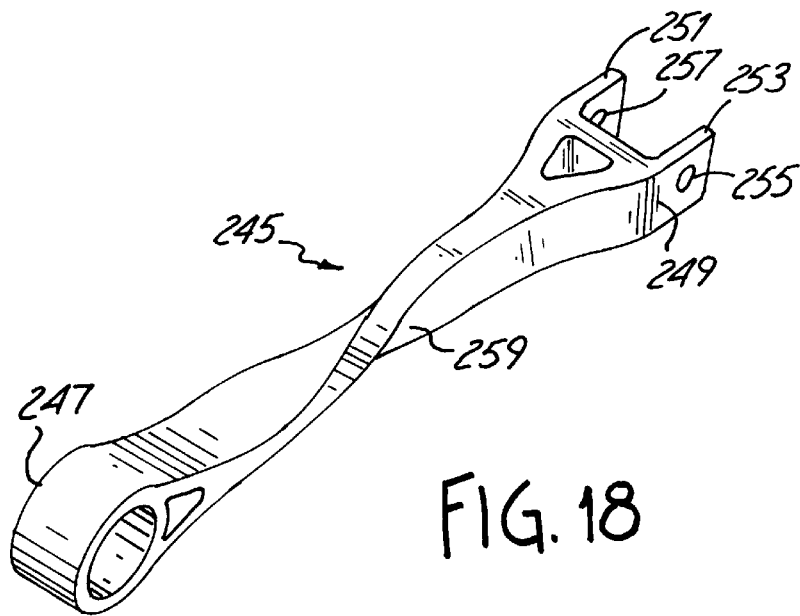
FIG. 18 is yet a further alternative embodiment of the present invention wherein the link arm has undergone further processing to introduce a twist or curve.

Lastly, referring to FIG. 18 there shown yet another embodiment of the present invention. This embodiment, link arm 245 includes a first and 247 having a circular opening therein, and a second end 249 having a substantially y-shape configuration. As will be appreciated, this y-shape configuration at second end 249 includes a first leg 251 and a second leg 253 which extends potentially parallel to one another. This structure can easily be linked to various other structures using a bolt (not shown) which would extend through holes 255 and 257 legs 251 and 253. Link arm 245 also includes a twisted center section 259. Link arm 245 illustrates that further processing steps after steel welding can be utilized to create several alternative configurations.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A method of fabricating at least one link arm for use in a link arm suspension system, said method comprising:
    extruding a first unitary block having a first end and a second end, wherein the first end includes an eye section with a hollow eye interior and the second end includes a welding edge;
    extruding a second unitary block having a first end and a second end, wherein the first end includes an eye section with a hollow eye interior and the second end includes a welding edge;
    placing the welding edge of the first block adjacent to the welding edge of the second block to form a seam there between;
    joining the first block to the second block to form a joined block by moving a first rotating tool of a first friction stir welder along the seam so that a friction stir welded joint is formed; and
    cutting through the joined block at least once in a direction generally perpendicular to the stir welded joint so that the at least one cut separates at least one portion of the joined block having a predetermined width approximately equal to the desired width of a link arm, said at least one portion of the joined block defining at least one link arm.

2. The method of claim 1, further comprising:
    cutting through the joined block at least two times in a direction generally perpendicular to the stir welded joint so that the at least two cuts separate at least two portions of the joined block having a predetermined width approximately equal to the desired width of a link arm, said at least two portions defining at least two link arms.

3. The method of claim 2, further comprising:
    inserting a first sleeved bushing into the hollow eye interior of the first unitary block and a second sleeved bushing into the hollow eye interior of the second unitary block.

4. The method of claim 1, wherein the first unitary block further includes a hollow area between the eye section and the welding edge and the second unitary block further includes a hollow area between the eye section and the welding edge.

5. The method of claim 1, wherein joining the first block to the second block, further comprises:

placing a second friction stir welder adjacent the seam, so that the first friction stir welder and the second friction stir welder are positioned on opposite sides of the first block from one another; and moving a second rotating tool of the second friction stir welder along the seam, with the tool of the first friction stir welder so that a stir welded joint is formed.

6. The method of claim 1, wherein the rotating tool of the single friction stir welder includes a first welding tool and a second welding tool which are axially aligned and opposing one another, wherein the first welding tool operates from a first side of the seam while the second welding pin operates from an opposite side of the seam.

7. The method of claim 1, wherein said extruding said first and second unitary blocks comprises extruding first and second unitary blocks having a length substantially greater than a desired width of a link arm.

8. The method of claim 1, wherein said first and second unitary blocks are substantially identical to one another.

9. The method of claim 1, wherein said welding edges of said first and second unitary blocks comprise generally flat edges for generally uniform abutment of said first welding edge to said second welding edge.

10. The method of claim 1, wherein said method fabricates a plurality of link arms with a single welding process joining said first and second unitary blocks into said joined block.

11. The method of claim 10, wherein said at least one cut comprises a plurality of cuts separating a plurality of portions of the joined block, said plurality of portions defining a plurality of link arms.

* * * * *